United States Patent
Petrovic et al.

(10) Patent No.: US 9,639,911 B2
(45) Date of Patent: May 2, 2017

(54) WATERMARK DETECTION USING A MULTIPLICITY OF PREDICTED PATTERNS

(71) Applicant: Verance Corporation, San Diego, CA (US)

(72) Inventors: Rade Petrovic, San Diego, CA (US); Jian Zhao, San Diego, CA (US); Joseph M. Winograd, San Diego, CA (US)

(73) Assignee: Verance Corporation, San Diego, CA (US)

( * ) Notice: Subject to any disclaimer, the term of this patent is extended or adjusted under 35 U.S.C. 154(b) by 44 days.

(21) Appl. No.: 14/830,641

(22) Filed: Aug. 19, 2015

(65) Prior Publication Data

US 2016/0055606 A1 Feb. 25, 2016

Related U.S. Application Data

(60) Provisional application No. 62/039,547, filed on Aug. 20, 2014.

(51) Int. Cl.
*G06K 9/00* (2006.01)
*G06T 1/00* (2006.01)
(Continued)

(52) U.S. Cl.
CPC ............ *G06T 1/0028* (2013.01); *G06F 21/16* (2013.01); *G06K 9/00744* (2013.01);
(Continued)

(58) Field of Classification Search
CPC .................. G06T 1/0028; G06T 2201/0065
See application file for complete search history.

(56) References Cited

U.S. PATENT DOCUMENTS

| 6,122,610 A | 9/2000 | Isabelle |
| 6,145,081 A | 11/2000 | Winograd et al. |

(Continued)

FOREIGN PATENT DOCUMENTS

| EP | 1474924 A2 | 11/2004 |
| EP | 2439735 A1 | 4/2012 |

(Continued)

OTHER PUBLICATIONS

International Search Report and Written Opinion dated Jan. 21, 2016 for International Application No. PCT/US2015/046166, filed Aug. 20, 2015 (8 pages).

(Continued)

*Primary Examiner* — Oneal R Mistry
(74) *Attorney, Agent, or Firm* — Perkins Coie LLP; Donald L. Wenskay

(57) ABSTRACT

Methods, devices and computer program products allow improved detection of watermarks into and from a multimedia content. One method for detecting watermarks from a host content includes performing watermark extraction to obtain a first sequence of watermark symbols from the host content and generating a plurality of predicted watermark templates. Each template corresponds to a sequence of watermark symbols that is predicted based on the first sequence of watermark symbols. A section of the host content is processed to obtain a candidate sequence of watermark symbols and correlation operations between the candidate sequence of watermark symbols and symbols of the predicted watermark templates are performed until a correlation result that is indicative of a successful watermark detection is obtained. An indication that the candidate sequence of watermark symbols represents at least a portion of a reliably extracted watermark message can then be produced.

35 Claims, 4 Drawing Sheets

(51) Int. Cl.
  *H04N 19/467*    (2014.01)
  *H04N 5/08*      (2006.01)
  *G06F 21/16*     (2013.01)
  *H04N 21/00*     (2011.01)
  *H04N 21/4627*   (2011.01)
  *H04N 21/8358*   (2011.01)

(52) U.S. Cl.
  CPC ............ *G06T 1/005* (2013.01); *G06T 1/0085* (2013.01); *H04N 5/08* (2013.01); *H04N 19/467* (2014.11); *H04N 21/00* (2013.01); *H04N 21/4627* (2013.01); *H04N 21/8358* (2013.01); *G06T 2201/005* (2013.01); *G06T 2201/0065* (2013.01)

(56) References Cited

U.S. PATENT DOCUMENTS

| | | |
|---|---|---|
| 6,175,627 B1 | 1/2001 | Petrovic et al. |
| 6,427,012 B1 | 7/2002 | Petrovic |
| 6,430,301 B1 | 8/2002 | Petrovic |
| 6,490,579 B1 | 12/2002 | Gao et al. |
| 6,577,747 B1 | 6/2003 | Kalker et al. |
| 6,683,958 B2 | 1/2004 | Petrovic |
| 6,792,542 B1 | 9/2004 | Lee et al. |
| 6,839,673 B1 | 1/2005 | Choi et al. |
| 6,888,943 B1 | 5/2005 | Lam et al. |
| 6,931,536 B2 | 8/2005 | Hollar |
| 7,024,018 B2 | 4/2006 | Petrovic |
| 7,140,043 B2 | 11/2006 | Choi et al. |
| 7,159,118 B2 | 1/2007 | Petrovic |
| 7,224,819 B2 | 5/2007 | Levy et al. |
| 7,460,667 B2 | 12/2008 | Lee et al. |
| 7,533,266 B2 | 5/2009 | Bruekers et al. |
| 7,707,422 B2 | 4/2010 | Shin et al. |
| 7,779,271 B2 | 8/2010 | Langelaar |
| 7,983,922 B2 | 7/2011 | Neusinger et al. |
| 7,986,806 B2 | 7/2011 | Rhoads |
| 7,991,995 B2 | 8/2011 | Rabin et al. |
| 8,015,410 B2 | 9/2011 | Pelly et al. |
| 8,055,013 B2 | 11/2011 | Levy et al. |
| 8,059,815 B2 | 11/2011 | Lofgren et al. |
| 8,059,858 B2 | 11/2011 | Brundage et al. |
| 8,081,757 B2 | 12/2011 | Voessing et al. |
| 8,085,935 B2 | 12/2011 | Petrovic |
| 8,138,930 B1 | 3/2012 | Heath |
| 8,151,113 B2 | 4/2012 | Rhoads |
| 8,181,262 B2 | 5/2012 | Cooper et al. |
| 8,189,861 B1 | 5/2012 | Rucklidge |
| 8,194,803 B2 | 6/2012 | Baum et al. |
| 8,249,992 B2 | 8/2012 | Harkness et al. |
| 8,259,873 B2 | 9/2012 | Baum et al. |
| 8,280,103 B2 | 10/2012 | Petrovic et al. |
| 8,301,893 B2 | 10/2012 | Brundage |
| 8,315,835 B2 | 11/2012 | Tian et al. |
| 8,321,679 B2 | 11/2012 | Petrovic et al. |
| 8,340,348 B2 | 12/2012 | Petrovic et al. |
| 8,346,532 B2 | 1/2013 | Chakra et al. |
| 8,346,567 B2 | 1/2013 | Petrovic et al. |
| 8,467,717 B2 | 6/2013 | Croy et al. |
| 8,479,225 B2 | 7/2013 | Covell et al. |
| 8,483,136 B2 | 7/2013 | Yuk et al. |
| 8,533,481 B2 | 9/2013 | Petrovic et al. |
| 8,538,066 B2 | 9/2013 | Petrovic et al. |
| 8,560,604 B2 | 10/2013 | Shribman et al. |
| 8,588,459 B2 | 11/2013 | Bloom et al. |
| 8,589,969 B2 | 11/2013 | Falcon |
| 8,601,504 B2 | 12/2013 | Stone et al. |
| 8,615,104 B2 | 12/2013 | Petrovic et al. |
| 8,666,528 B2 | 3/2014 | Harkness et al. |
| 8,682,026 B2 | 3/2014 | Petrovic et al. |
| 8,726,304 B2 | 5/2014 | Petrovic et al. |
| 8,745,403 B2 | 6/2014 | Petrovic |
| 8,768,714 B1 | 7/2014 | Blesser |
| 8,781,967 B2 | 7/2014 | Tehranchi et al. |
| 8,791,789 B2 | 7/2014 | Petrovic et al. |
| 8,806,517 B2 | 8/2014 | Petrovic et al. |
| 8,811,655 B2 | 8/2014 | Petrovic et al. |
| 8,825,518 B2 | 9/2014 | Levy |
| 8,838,977 B2 | 9/2014 | Winograd et al. |
| 8,838,978 B2 | 9/2014 | Winograd et al. |
| 8,869,222 B2 | 10/2014 | Winograd et al. |
| 8,898,720 B2 | 11/2014 | Eyer |
| 8,923,548 B2 | 12/2014 | Petrovic et al. |
| 8,959,202 B2 | 2/2015 | Haitsma et al. |
| 8,990,663 B2 | 3/2015 | Liu et al. |
| 9,009,482 B2 | 4/2015 | Winograd |
| 9,042,598 B2 | 5/2015 | Ramaswamy et al. |
| 9,055,239 B2 | 6/2015 | Tehranchi et al. |
| 9,106,964 B2 | 8/2015 | Zhao |
| 9,117,270 B2 | 8/2015 | Wong et al. |
| 9,147,402 B2 | 9/2015 | Chen et al. |
| 9,277,183 B2 | 3/2016 | Eyer |
| 2002/0032864 A1 | 3/2002 | Rhoads et al. |
| 2002/0138695 A1 | 9/2002 | Beardsley et al. |
| 2003/0228030 A1* | 12/2003 | Wendt ............... G06T 1/0064 382/100 |
| 2004/0039914 A1* | 2/2004 | Barr ............... G06T 1/0028 713/176 |
| 2004/0250080 A1* | 12/2004 | Levy ............... G06T 1/0064 713/176 |
| 2005/0182792 A1 | 8/2005 | Israel et al. |
| 2006/0047704 A1 | 3/2006 | Gopalakrishnan |
| 2006/0053292 A1 | 3/2006 | Langelaar |
| 2006/0083242 A1 | 4/2006 | Pulkkinen |
| 2006/0115108 A1 | 6/2006 | Rodriguez et al. |
| 2007/0003103 A1 | 1/2007 | Lemma et al. |
| 2007/0039018 A1 | 2/2007 | Saslow et al. |
| 2007/0250560 A1 | 10/2007 | Wein et al. |
| 2008/0297654 A1 | 12/2008 | Verberkt et al. |
| 2008/0301304 A1 | 12/2008 | Chitsaz et al. |
| 2009/0060055 A1 | 3/2009 | Blanchard et al. |
| 2009/0089078 A1 | 4/2009 | Bursey |
| 2009/0158318 A1 | 6/2009 | Levy |
| 2009/0319639 A1 | 12/2009 | Gao et al. |
| 2010/0023489 A1 | 1/2010 | Miyata et al. |
| 2010/0054531 A1 | 3/2010 | Kogure et al. |
| 2010/0063978 A1 | 3/2010 | Lee et al. |
| 2010/0131461 A1 | 5/2010 | Prahlad et al. |
| 2010/0172540 A1 | 7/2010 | Davis et al. |
| 2010/0174608 A1 | 7/2010 | Harkness et al. |
| 2010/0281142 A1 | 11/2010 | Stoyanov |
| 2011/0088075 A1 | 4/2011 | Eyer |
| 2011/0103444 A1 | 5/2011 | Baum et al. |
| 2011/0161086 A1 | 6/2011 | Rodriguez |
| 2011/0188700 A1 | 8/2011 | Kim et al. |
| 2011/0261667 A1 | 10/2011 | Ren et al. |
| 2011/0286625 A1 | 11/2011 | Petrovic et al. |
| 2011/0293090 A1 | 12/2011 | Ayaki et al. |
| 2011/0320627 A1 | 12/2011 | Landow et al. |
| 2012/0023595 A1 | 1/2012 | Speare et al. |
| 2012/0072731 A1 | 3/2012 | Winograd et al. |
| 2012/0102304 A1 | 4/2012 | Brave |
| 2012/0117031 A1 | 5/2012 | Cha et al. |
| 2012/0122429 A1 | 5/2012 | Wood et al. |
| 2012/0129547 A1 | 5/2012 | Andrews, III et al. |
| 2012/0203556 A1 | 8/2012 | Villette et al. |
| 2012/0203734 A1 | 8/2012 | Spivack et al. |
| 2012/0216236 A1 | 8/2012 | Robinson et al. |
| 2012/0265735 A1 | 10/2012 | McMillan et al. |
| 2012/0272012 A1 | 10/2012 | Aronovich et al. |
| 2012/0272327 A1 | 10/2012 | Shin et al. |
| 2012/0300975 A1 | 11/2012 | Chalamala et al. |
| 2012/0304206 A1 | 11/2012 | Roberts et al. |
| 2012/0308071 A1 | 12/2012 | Ramsdell et al. |
| 2013/0007462 A1 | 1/2013 | Petrovic et al. |
| 2013/0024894 A1 | 1/2013 | Eyer |
| 2013/0031579 A1 | 1/2013 | Klappert |
| 2013/0060837 A1 | 3/2013 | Chakraborty et al. |
| 2013/0073065 A1 | 3/2013 | Chen et al. |
| 2013/0114848 A1 | 5/2013 | Petrovic et al. |
| 2013/0117571 A1* | 5/2013 | Petrovic ............... H04L 9/00 713/176 |
| 2013/0129303 A1 | 5/2013 | Lee et al. |

(56) References Cited

U.S. PATENT DOCUMENTS

| | | | |
|---|---|---|---|
| 2013/0151855 A1 | 6/2013 | Petrovic et al. |
| 2013/0151856 A1 | 6/2013 | Petrovic et al. |
| 2013/0152210 A1 | 6/2013 | Petrovic et al. |
| 2013/0171926 A1 | 7/2013 | Perret et al. |
| 2014/0047475 A1 | 2/2014 | Oh et al. |
| 2014/0059591 A1 | 2/2014 | Terpstra et al. |
| 2014/0067950 A1 | 3/2014 | Winograd |
| 2014/0068686 A1 | 3/2014 | Oh et al. |
| 2014/0074855 A1 | 3/2014 | Zhao et al. |
| 2014/0075465 A1 | 3/2014 | Petrovic et al. |
| 2014/0075469 A1 | 3/2014 | Zhao |
| 2014/0115644 A1 | 4/2014 | Kim et al. |
| 2014/0196071 A1 | 7/2014 | Terpstra et al. |
| 2014/0267907 A1 | 9/2014 | Downes et al. |
| 2014/0270337 A1 | 9/2014 | Zhao et al. |
| 2014/0279549 A1 | 9/2014 | Petrovic et al. |
| 2014/0325550 A1 | 10/2014 | Winograd et al. |
| 2014/0325673 A1 | 10/2014 | Petrovic |
| 2015/0030200 A1 | 1/2015 | Petrovic et al. |
| 2015/0043728 A1 | 2/2015 | Kim et al. |
| 2015/0043768 A1 | 2/2015 | Breebaart |
| 2015/0121534 A1 | 4/2015 | Zhao et al. |
| 2015/0170661 A1 | 6/2015 | Srinivasan |
| 2015/0229979 A1 | 8/2015 | Wood et al. |
| 2015/0261753 A1 | 9/2015 | Winograd et al. |
| 2015/0264429 A1 | 9/2015 | Winograd et al. |
| 2015/0324947 A1 | 11/2015 | Winograd et al. |
| 2015/0340045 A1 | 11/2015 | Hardwick et al. |
| 2016/0055607 A1 | 2/2016 | Petrovic et al. |
| 2016/0057317 A1 | 2/2016 | Zhao et al. |
| 2016/0148334 A1 | 5/2016 | Petrovic et al. |
| 2016/0150297 A1 | 5/2016 | Petrovic et al. |
| 2016/0182973 A1 | 6/2016 | Winograd et al. |
| 2016/0241932 A1 | 8/2016 | Winograd et al. |

FOREIGN PATENT DOCUMENTS

| | | | |
|---|---|---|---|
| EP | 2489181 A2 | 8/2012 |
| EP | 2899720 A1 | 7/2015 |
| JP | 2004163855 | 6/2004 |
| JP | 2004173237 | 6/2004 |
| JP | 2004193843 | 7/2004 |
| JP | 2004194233 | 7/2004 |
| JP | 2004328747 | 11/2004 |
| JP | 2005051733 | 2/2005 |
| JP | 2005-094107 | 4/2005 |
| JP | 2005525600 | 8/2005 |
| JP | 20100272920 | 12/2010 |
| KR | 1020080087047 | 9/2008 |
| KR | 20100009384 | 1/2010 |
| KR | 10201016712 | 2/2011 |
| KR | 20120083903 A | 7/2012 |
| KR | 1020120128149 | 11/2012 |
| KR | 20130074922 A | 7/2013 |
| KR | 20130078663 A | 7/2013 |
| KR | 101352917 B1 | 1/2014 |
| KR | 10201424049 | 7/2014 |
| WO | 0059148 A1 | 10/2000 |
| WO | 2005017827 | 2/2005 |
| WO | 2005038778 | 4/2005 |
| WO | 2006051043 | 5/2006 |
| WO | 2009031082 | 3/2009 |
| WO | 2010073236 | 7/2010 |
| WO | 2010135687 | 11/2010 |
| WO | 2011046590 A2 | 4/2011 |
| WO | 2011116309 | 9/2011 |
| WO | 2012177126 A1 | 12/2012 |
| WO | 2012177874 A2 | 12/2012 |
| WO | 2013025035 A2 | 2/2013 |
| WO | 2013163921 | 11/2013 |
| WO | 2015138798 | 9/2015 |
| WO | 2015168697 | 11/2015 |
| WO | 2015174086 | 11/2015 |
| WO | 2016028934 | 2/2016 |
| WO | 2016028936 | 2/2016 |
| WO | 2016029055 | 2/2016 |
| WO | 2016086047 A1 | 6/2016 |

OTHER PUBLICATIONS

International Search Report and Written Opinion dated Apr. 12, 2016 for International Application No. PCT/US2015/066872, filed Dec. 18, 2015 (7 pages).
Office Action dated Jun. 10, 2016 for Korean Patent Application No. 10-2016-7002291 (19 pages).
Office Action dated Jul. 28, 2016 for Korean Patent Application No. 10-2016-7002289 (11 pages).
Office action dated Nov. 30, 2016 for Korean Patent Application No. 10-2016-7002289 (4 pages).
"ATSC-3.0 Automatic Content Recognition Watermarking Solutions," ATSC Technology Group, Advanced Television Systems Committee, Inc., Jan. 2014 (6 pages).
Aris Technologies, Inc. "Audio Watermarking System to Screen Digital Audio Content for LCM Acceptance," May 1999 (17 pages).
Bangaleea, R., et al., "Performance improvement of spread spectrum spatial-domain watermarking scheme through diversity and attack characterisation," IEEE Africon, pp. 293-298, 2002.
Hartung, F., et al., "Watermarking of MPEG-2 encoded video without decoding and re-coding," Proc. SPIE Multimedia Computing and Networking 97, 3020:264-274, Feb. 1997.
Hartung, F., et al., "Watermarking of uncompressed and compressed video," Signal Processing, 3(66):283-301, May 1998.
International Search Report and Written Opinion dated Aug. 13, 2015 for International Application No. PCT/US2015/029097, filed May 4, 2015 (14 pages).
International Search Report and Written Opinion dated Dec. 7, 2015 for International Application No. PCT/US2015/045960, filed Aug. 19, 2015 (14 pages).
International Search Report and Written Opinion dated Jan. 28, 2016 for International Application No. PCT/US2015/045964, filed Aug. 19, 2015 (8 pages).
International Search Report and Written Opinion dated May 28, 2015 for International Application No. PCT/US2015/020282, filed Mar. 12, 2015 (7 pages).
Kalker, T., et al., "System issues in digital image and video watermarking for copy protection," Proc. IEEE Int. Conf. on Multimedia Computing and Systems, pp. 562-567, Jun. 1999.
Kirovski, D., et al., "Multimedia content screening using a dual watermarking and fingerprinting system," Proceedings of the tenth ACM international conference, pp. 372-381, 2002.
Kirovski, D., et al., "Multimedia content screening using a dual watermarking and fingerprinting system," Multimedia '02 Proceedings of the tenth ACM international conference on Multimedia, 2002 (11 pages).
Verance Corporation, "Confirmedia," PowerPoint presentation made to National Association of Broadcasters, Apr. 24, 2001 (40 pages).
Zhao, J., "A WWW service to embed and prove digital copyright watermarks," Proc. European Conf. on Multimedia Applications, Services and Techniques (ECMAST'96), May 1996 (15 pages).
Zhao, J., "Applying digital watermarking techniques to online multimedia commerce," Proc. Int. Conf. on Imaging Science, Systems and Applications (CISSA'97), Jun./Jul. 1997 (7 pages).
International Search Report and Written Opinion dated Mar. 15, 2016 for International Application No. PCT/US2015/062514, filed Nov. 24, 2015 (10 pages).

* cited by examiner

WATERMARK DETECTION USING A MULTIPLICITY OF PREDICTED PATTERNS

CROSS REFERENCE TO RELATED APPLICATIONS

This application claims the benefit of priority of U.S. Provisional Patent Application No. 62/039,547, filed Aug. 20, 2014, the entire contents of which are incorporated by reference as part of the disclosure of this document.

TECHNICAL FIELD

The subject matter of this patent document relates to management of multimedia content and more specifically to detection of watermarks to facilitate recognition and utilization of multimedia. content.

BACKGROUND

The use and presentation of multimedia content on a variety of mobile and fixed platforms have rapidly proliferated. By taking advantage of storage paradigms, such as cloud-based storage infrastructures, reduced form factor of media players, and high-speed wireless network capabilities, users can readily access and consume multimedia content regardless of the physical location of the users or the multimedia content. A multimedia. content, such as an audiovisual content, can include a series of related images, which, when shown in succession, impart an impression of motion, together with accompanying sounds, if any. Such a content can be accessed from various sources including local storage such as hard drives or optical disks, remote storage such as Internet sites or cable/satellite distribution servers, over-the-air broadcast channels, etc.

In some scenarios, such a multimedia content, or portions thereof, may contain only one type of content, including, but not limited to, a still image, a video sequence and an audio clip, while in other scenarios, the multimedia content, or portions thereof, may contain two or more types of content such as audiovisual content and a wide range of metadata. The metadata can, for example include one or more of the following: channel identification, program identification, content and content segment identification, content size, the date at which the content was produced or edited, identification information regarding the owner and producer of the content, timecode identification, copyright information, closed captions, and locations such as URLs where advertising content, software applications, interactive services content, and signaling that enables various services, and other relevant data that can be accessed. In general, metadata is the information about the content essence (e.g., audio and/or video content) and associated services (e.g., interactive services, targeted advertising insertion).

The metadata can enable content management, annotation, packaging, and search throughout content production and distribution value chain. Since the introduction of digital TVs, metadata has been introduced to enable digital interactive features and services. Various standardization efforts (such as MPEG-7, MPEG-21, TV-Anytime, DVB-SI, ATSC) strive to produce metadata standards with predefined data structures and transport methods for describing essence to support interoperability and unified services.

While such metadata may be useful in some applications, especially for enabling broadcast interactive services, they must be interleaved, prepended or appended to a multimedia content, which occupies additional bandwidth and, more importantly, can be lost when content is transformed into a different format (such as digital to analog conversion, transcoded into a different file format, etc.), processed (such as transcoding), and/or transmitted through a communication protocol/interface (such as HDMI, adaptive streaming). Notably, in some scenarios, an intervening device such as a set-top box issued by a multichannel video program distributor (MVPD) receives a multimedia content from a content source and provides the uncompressed multimedia content to a television set or another presentation device, which can result in the loss of various metadata and functionalities such as interactive applications that would otherwise accompany the multimedia content. Therefore alternative techniques for content identification can complement or replace metadata multiplexing techniques.

One technique to mitigate the above problems is to embed watermarks into the content to enable automatic content recognition (ACR) and metadata recovery. Watermarks can be embedded in the audio and/or video portions of a content and are substantially imperceptible to a viewer (or listener) of the content. Properly designed watermarks can be immune to various content processing operations and channel impairments, such as compression and decompression, cropping, scaling, transcoding, format conversion, noise addition, acoustic propagation, optical (e.g., free space) transmission, digital-to-analog (D/A) and analog-to-digital (A/D) conversions and the like. Once detected by a watermark detector (also sometimes referred to as a watermark extractor), the payload of the watermark can be used to identify the content and recover the metadata associated with the identified content.

SUMMARY OF CERTAIN EMBODIMENTS

Figure 1:
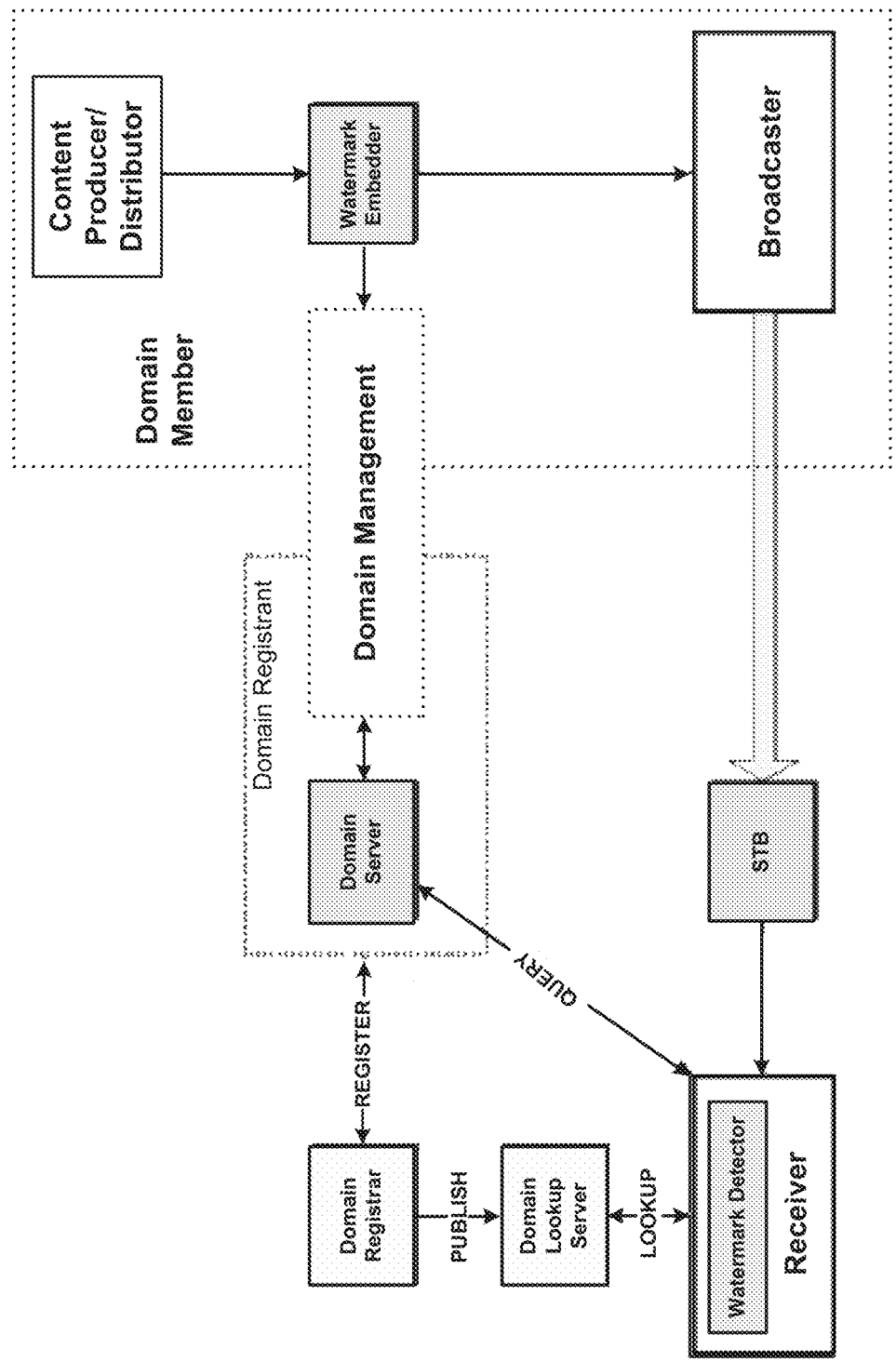
FIG. 1 illustrates a system for providing automatic content recognition and acquisition of interactive content in accordance with an exemplary embodiment.

The disclosed technology relates to improved techniques for detection of watermarks that are embedded in a content to allow faster automatic recognition of the content and acquisition of metadata associated with the content.

One aspect of the disclosed embodiments relates to a method for detecting watermarks from a host content that includes performing watermark extraction to obtain a first sequence of watermark symbols from the host content, and generating a plurality of predicted watermark templates. Each template corresponds to a sequence of watermark symbols that is predicted based on the first sequence of watermark symbols. The method further includes processing a section of the host content to obtain a candidate sequence of watermark symbols from the section of the host content, and conducting correlation operations between the candidate sequence of watermark symbols and symbols of the predicted watermark templates until a correlation result that is indicative of a successful watermark detection is obtained.

The method also includes producing an indication that the candidate sequence of watermark symbols represents at least a portion of a reliably extracted watermark message.

Another aspect of the disclosed embodiments relates to a device that includes a processor, and a memory including processor executable code, the processor executable code, when executed by the processor causes the device to conduct watermark extraction operations to obtain a first sequence of watermark symbols from a host content and to generate a plurality of predicted watermark templates, where each template corresponds to a sequence of watermark symbols that is predicted based on the first sequence of watermark symbols. The processor executable code, when executed by the processor further causes the device to process a section of the host content to obtain a candidate sequence of watermark symbols from the section of the host content, conduct correlation operations between the candidate sequence of watermark symbols and each of the predicted watermark templates until a correlation result that is indicative of a successful watermark detection is obtained, and produce an indication that the candidate sequence of watermark symbols represents at least a portion of a reliably extracted watermark message.

In one exemplary embodiment, the processor executable code, when executed by the processor causes the device to generate one or more of the plurality of the predicted watermark templates based on a predetermined change in the first sequence of watermark symbols, In another exemplary embodiment, the section of the host content includes at least one partial watermark message, and the indication that the candidate sequence of watermark symbols represents at least a portion of a reliably extracted watermark message confirms the presence of the partial watermark message in the section of the host content. In yet another exemplary embodiment, the processor executable code, when executed by the processor further causes the device to produce an indication that the section of the host content represents an end section of a marked content.

In one exemplary embodiment, the processor executable code, when executed by the processor further causes the device to, based on the predicated watermark template that produced the correlation result indicative of a successful watermark detection, trigger a change in playback or presentation of another content or a service that is associated with the host content. In another exemplary embodiment, the processor executable code, when executed by the processor further causes the device to, based on the predicated watermark template that produced the correlation result indicative of a successful watermark detection, trigger a request for metadata associated with the host content, In still another exemplary embodiment, the processor executable code, when executed by the processor further configures the device to process the section of the host content to obtain a second candidate sequence of watermark symbols from the section of the host content, conduct correlation operations between the second candidate sequence of watermark symbols and symbols of the plurality of predicted watermark templates, and upon a determination that none of the plurality of predicted watermark templates produces a correlation value that corresponds to a successful watermark detection, produce an indication that the second candidate sequence of watermark symbols does not represent a reliably extracted watermark message or a portion thereof.

Another aspect of the disclosed embodiments relates to a computer program product, embodied on one or more non-tangible computer readable media, that includes program code for conducting watermark extraction operations to obtain a first sequence of watermark symbols that is expected to be present in the host content, and program code for generating a plurality of predicted watermark templates, where each template corresponds to a sequence of watermark symbols that is predicted based on the first sequence of watermark symbols. The one or more non-tangible computer readable media further include program code for processing a section of the host content to obtain a candidate sequence of watermark symbols from the section of the host content, and program code for conducting correlation operations between the candidate sequence of watermark symbols and symbols of the predicted watermark templates until a correlation result that is indicative of a successful watermark detection is obtained. The one or more non-tangible computer readable media also include program code for producing an indication that the candidate sequence of watermark symbols represents at least a portion of a reliably extracted watermark message.

DETAILED DESCRIPTION

In the following description, for purposes of explanation and not limitation, details and descriptions are set forth in order to provide a thorough understanding of the disclosed embodiments. However, it will be apparent to those skilled in the art that the present invention may be practiced in other embodiments that depart from these details and descriptions.

Additionally, in the subject description, the word "exemplary" is used to mean serving as an example, instance, or illustration. Any embodiment or design described herein as "exemplary" is not necessarily to be construed as preferred or advantageous over other embodiments or designs. Rather, use of the word exemplary is intended to present concepts in a concrete manner.

As noted earlier, watermarks that are embedded into a multimedia content (e.g., in the audio or video portions) can be used for automatic content recognition (ACR). The payloads of the detected watermarks can be used to identify the content and the temporal position (timing information) of the content segments that are being rendered. Further, the associated metadata can be recovered to enable various operations, such as receiving an additional content, performing dynamic advertising insertion, or participating in an interactive opportunity. The viewing device (or an associated device) can be connected to the Internet (or more generally, to a remote database) for the retrieval of the additional content, for participating in the interactive opportunities or other services.

In ACR applications, watermarks are often designed with a set of requirements that differ from requirements that are imposed on other watermark detectors, such as copy control watermark detectors. For example, in ACR applications it is critical to be able to recognize a content very quickly so as to allow the associated content, metadata or interactive services to be readily accessed and provided to the users (who often have a short attention span). It is also desirable to detect the precise boundaries of the embedded watermarks that can trigger further events, such as to stop or start presentation of a particular related content or service in a manner that is synchronized with the main content. In some applications, watermark detectors should also be able to detect changes in the content rendering timeline. For example, When a user decides to switch from one content to another, or chooses to skip forward or backward within a content, the watermark detector should recognize such actions as fast as possible and report them to allow further actions to occur. For example, a content interruption caused by a channel change can provide a trigger for discontinuing the playback of an associated secondary content (e.g., an advertisement, an interactive content or service, etc.), or trigger the playback of a new associated content.

The disclosed embodiments, among other advantages and benefits, address the above noted challenges by improving the speed and precision of watermark detection from a multimedia content.

FIG. 1 illustrates a system for providing automatic content recognition for content that is provided by a broadcaster or redistributor to a consumer device and acquisition of interactive content that can be used for accommodating the disclosed embodiments. The system of FIG. I is one example of an ecosystem that can accommodate, and benefit from, the disclosed watermark detection techniques. The system of FIG. 1 is compatible with the requirements of the Advanced Television Systems Committee (ATSC), Inc., Call for Proposals For ATSC-3.0 AUTOMATIC CONTENT RECOGNITION WATERMARKING SOLUTIONS—ATSC Technology Group 3 (ATSC 3.0) (S33 Doc. 067r3).

The content in FIG. 1 is embedded with watermarks by a Domain Member prior to broadcast. For example, such a Domain Member can be a content producer or a Broadcaster. A Broadcaster (which can also be called a Redistributor) transmits the content to one or more user premises. Such content is often received at a receiver such as a set top box (STB), where decompression and formatting operations may take place before the content is provided (typically via a HDMI interface) to a viewing device (sometimes referred to as the "Receiver" or the "Receiver Device"). Such a Receiver can be compliant with the ATSC 3.0 standard. Decompression and formatting may alternatively take place within the Receiver. The Receiver which includes a watermark detector, examines the received content for the presence of watermarks. Such a detector can incorporate the improved watermark detection techniques of the disclosed embodiments. The detection of watermarks may trigger further actions such as identifying a domain name associated with the detected watermark payload and sending a query to an identified domain server.

It should be noted that while in some implementations, the Receiver is a separate component than the set-top box, in other implementations the Receiver may include, or be part of a larger device that includes, any one or combinations of additional components such as a set-top box, a display, keyboard or other user interface devices, or a watermark detector, as well as processors (e.g., microprocessors, digital signal processors (DSPs), etc.) and other circuitry that may be needed for implementation of such device, or devices.

The watermark structure in some exemplary embodiments includes the following fields: a Domain ID and a Sequence ID. Each Domain ID is assigned by a central authority to a Domain Registrant who controls assignment and use of the Sequence ID codes under that domain. Each Domain ID maps one-to-one to an Internet domain name which is used to retrieve metadata associated with Sequence IDs in that domain. The Domain Registrar in FIG. 1 is a unique centralized entity responsible for registering such Domain IDs and publishing the mapping between the Domain IDs and domain names to Domain Lookup Servers. Domain registration is a process wherein a Domain ID is uniquely assigned to a Domain Registrant entity. The Domain Registrar provides Domain Registrant with a process (e.g., designated as REGISTER in FIG. 1) to establish and maintain the relationship between the Domain ID and a domain name (e.g., Internet formal). Multiple Domain IDs may be mapped to the same domain name. The Domain Registrar further maintains a database of all mappings from Domain IDs to domain names. The Domain Registrar employs a standardized protocol (e.g., designated as PUBLISH in FIG. 1) to publish new and modified domain mappings to Domain Lookup Services that can include Domain Lookup Servers, as well as any other devices that may be needed to implement Domain Lookup Services. This protocol used by the Domain Registrar enables interoperability between the central Domain Registrar and all Domain lookup services. In some implementations, support for PUBLISH protocol is mandatory on both the Domain Lookup Servers and the Domain Registrar.

Domain Lookup Server(s) maintain a copy of the Domain Registration database which maps each registered Domain ID to a domain name and keeps it current using the PUBLISH protocol with the Domain Registrar. Domain Lookup Server(s) also employ a standardized protocol (e.g., designated as LOOKUP in FIG. 1) to provide domain name mappings from the database in response to Domain ID lookup queries originated by the Receivers. The use of a standardized LOOKUP protocol allows interoperability, between any Receiver and any Domain Lookup Server. In some embodiments the Receivers are ATSC-compatible or ATSC-complaint. That is, those receivers comply with ATSC requirements, such as those under ATSC 3.0.

Domain Servers can be Internet servers that are accessible at the domain name associated with a registered Domain ID and can provide metadata to Receivers in response to queries triggered by watermark detections. In some implementations, queries employ a standardized message protocol (e.g., designated as QUERY in FIG. 1). A query is initiated by a Receiver and provides the domain server with a Domain ID and Sequence ID. The Domain Server responds with available metadata (e.g. broadcast channel identifier, a broadcast segment identifier, a timecode, a signaling) associated with the provided Domain ID and Sequence ID. Domain servers are not required to provide data for all required data fields available for all queries. In some embodiments, support for the QUERY protocol is mandatory on all Receivers and Domain Servers in order to enable interoperability among all receivers and content. This protocol enables interoperability between all receivers and all domain servers and support may be mandatory on both the receivers and the domain servers.

Example Watermark Payload: In one example implementation, a 50-bit payload can be embedded in every 1.5 seconds of the content. In this example, the watermark payload can be standardized with the following structure: [Payload Type:2] [Payload:48]. That is, the right-most 48 bits are designated to carry the payload and the 2 left-most bits are designated to carry the Payload Type. For example, the Payload Type values can be in the range 0 to 3, where a "0" designates a Reserved payload type, a "1" designate a Large Domain payload type, a "2" designates a Medium Domain payload type, and a "3" designates a Small Domain payload type. The payload type values can thus each describe the structure of the payload. The payload structure for each payload type can be further defined according to the following example format:

Small Domain: [Domain field:30 bits][Sequence field:17 bits] [Trigger field:1 bit]

Medium Domain: [Domain field:22 bits][Sequence field:25 bits][Trigger field:1 bit]

Large Domain: [Domain field:18 bits][Sequence field:29 hits] [Trigger field:1 bit]

The Domain field from any structure can be mapped into a unique Domain ID by prepending the Payload Type value to the Domain field and zero-padding (on the right) to 32 bits. For ASCII encoding, the Domain ID can be represented as an 8-character hexadecimal value. Domain field value of 0 can be reserved in all domains. The Sequence field from any structure can be mapped directly into a Sequence ID. For ASCII encoding, hexadecimal representation of the Sequence field (leading zeroes optional) can be utilized. Sequence IDs with decimal value of 1024 or less can be reserved for use as Control Codes. Control Codes are currently reserved.

The trigger bit, when set (e.g. to a value of "1"), can inform the Receiver of an event that may activate the Receiver to perform various operations such as requesting metadata from the domain server. It indicates that further services or features, such as interactive content or advertising insertion associated with the Sequence ID should be available to the Receiver from the domain server associated with the payload's Domain ID. In some implementations the trigger field can include multiple bits.

One of the services caused by triggers may be presentation of a secondary audiovisual content, typically delivered via Internet, such as pre-fetched advertisements. Such audiovisual content is treated as regular audiovisual content, i.e., it can also be watermarked and watermark-based triggers can be registered with a domain server. Thus, the watermark payloads in the secondary content can also trigger interactive services. This is sometimes called "nested triggers".

Using the above watermark payload structures, if we assume that a watermark payload has temporal duration of 1.5 seconds, over 250,000 Large Domains can be identified (e.g. for long-term continuous embedding) that would allow 25.5 years of uniquely marked content per domain. This structure further allows over 4 Million Medium domains to be uniquely identified (e.g. for continuous marking of Olympics-scale events, annual channel assignments, or long-term selective embedding) that would allow 1.5 years of uniquely marked content per domain. The structure for Small Domains allows unique identification of over 1 Billion Small Domains (e.g. shows) with 54 hours of uniquely marked content per domain. Depending on the payload type, a domain may be assigned to one or more 1) broadcasters or content producers; 2) MVPDs; 3) channels; 4) sport events; 5) shows; 6) movies; or 7) episodes.

The watermark payload can undergo various coding, modulation and formatting operations before being embedded into a content. For example, the payload may be error correction code (FCC) encoded, scrambled, interleaved with other packets, appended with a synchronization or registration header, encrypted or channel coded to form a sequence of bits with particular characteristics. Once embedded into a host content, the embedded host content can be processed by a watermark extractor to recover the embedded watermark bits (or, more generally, symbols), and perform the reverse of the above coding, modulation or formatting schemes to recover the payload. In some instances, statistical techniques are used to recover the embedded symbols from the content using multiple instances of embedded watermarks.

Figure 2:
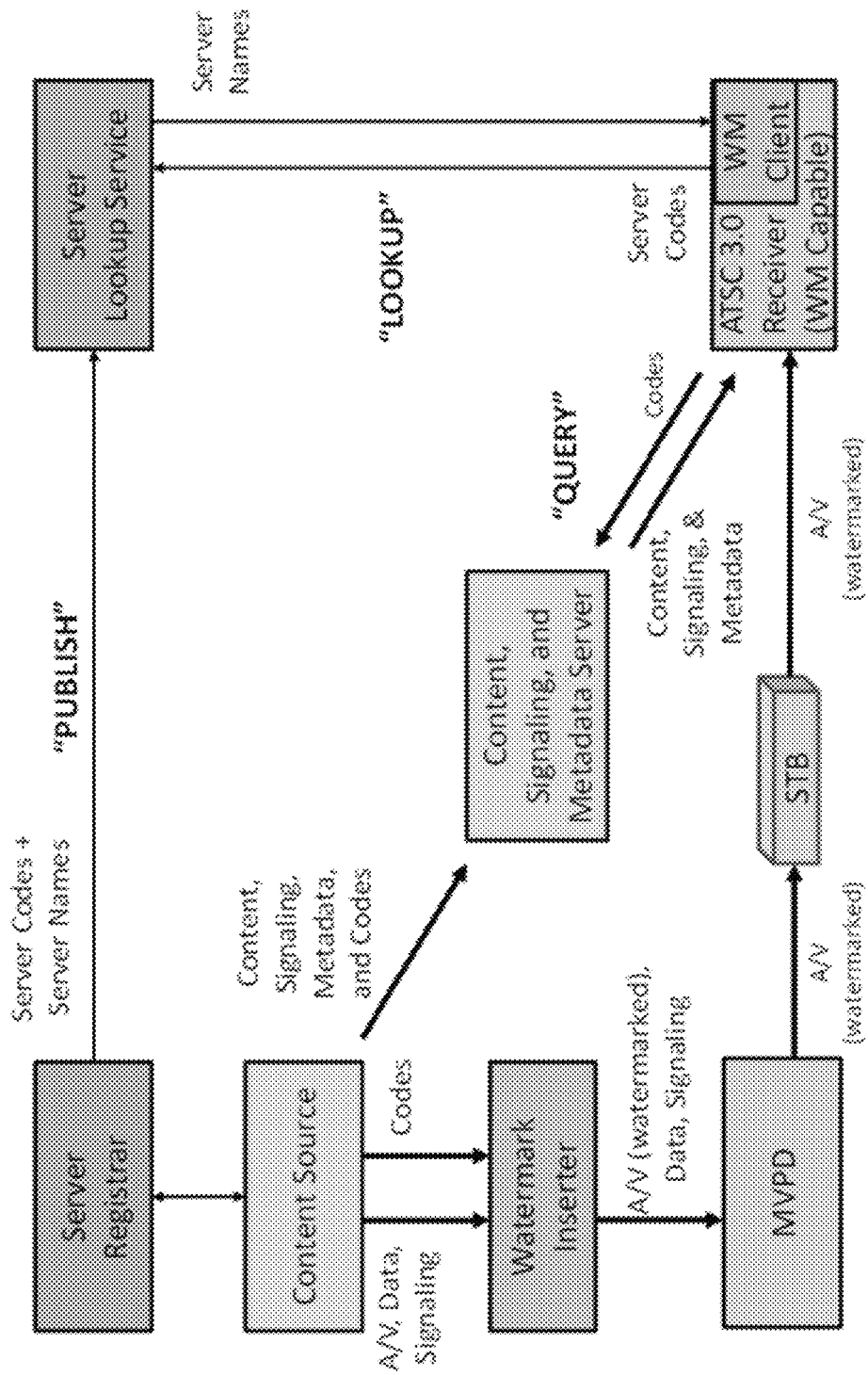
FIG. 2 illustrates another system and associated components that enables automatic content recognition and acquisition of corresponding metadata in accordance with an exemplary embodiment.

FIG. 2 provides another exemplary system that can accommodate, and benefit from, the disclosed watermark detection techniques, while conforming to ACR requirements of ATSC 3.0. Several components that are shown in FIG. 2 can find analogous counterparts in FIG. 1. For example, the Server Registrar and the Domain Registrar; the Content, Signaling and Metadata Server and Domain Server; and the Server Lookup Service/server and Domain Lookup Server can carry out analogous operations. The various components in FIG. 2 are further described below. A Server Registrar is established by ATSC for the purpose of registering ATSC Domains and assigning to each a unique Server Code. Registrants inform the registrar of a Server Name, which is the Internet domain name or URL at which metadata services associated with the Code Domain are located. The Server Registrar publishes the Server Code and associated Server Name to the Server Lookup Services.

One or more Server Lookup Services are established. These services may be operated by ATSC, the Server Registrar, Content Owners, ATSC Receiver manufacturers, or a third party. Each Server Lookup Service maintains a database of all Server Code/Server Name associations published by the Server Registrar and responds to lookup requests from ATSC Receivers. The Server Lookup Services do not need to access or store any broadcast metadata; they simply provide ATSC Receivers with access to Server Names associated with Server Codes detected from broadcast watermarks.

A Content Source, acting either as a Server Registrant or in concert with a Server Registrant, associates a valid registered Server Code and one or more unique Interval Codes and maps them to intervals of broadcast content essence. The Content Source embeds those codes in the broadcast content using a Watermark Inserter prior to delivery of the broadcast content to an MVPD. The Sever Code can be analogous to the Sequence ID described in the exemplary watermark payload above.

The Interval Codes and the metadata for those same intervals of broadcast essence (e.g. any interactive content, signaling, metadata, triggers, channel identifier, media timeline timecode, etc.) are associated together in a database which is provided to a Content, Signaling, and Metadata Server ("CSM Server"). Content Sources may associate and embed watermarks continuously throughout their program material using sequentially increasing Interval Codes (e.g., analogous the Sequence ID described in the exemplary watermark payload above), may embed watermarks only in those intervals of content where interactive services are enabled, or may embed an Interval Code repeatedly through a program segment where an interactive service is available but does not require timing precision. Content Sources may register additional Code Domains in advance of depleting the Interval Code space associated with a given Server Code and may associate newly assigned Server Codes with the same Internet domain name to maintain infrastructure continuity.

The CSM Server responds to various requests from ATSC Receivers, including delivery of signaling and interactive content based on interactive service data received from a complete broadcast stream. The CSM Server also responds to code metadata queries, in which a query containing the watermark payload (e.g. in the ASCII representational format) is submitted by the WM Client in an ATSC Receiver, with a request for metadata associated with the interval of broadcast content. The metadata included in the CSM Server response may include channel identifiers, timecodes, content or segment identifiers, triggers, etc. It should be noted that while metadata services can be hosted in the same servers as the content and signaling services, they may alternatively be hosted on different servers from those used for content and signaling services.

To enable the architecture that is depicted in FIG. 2, open standards can be provided for the following three network protocols: PUBLISH, LOOKUP, and QUERY.

PUBLISH is a protocol whereby the Server Registrar notifies interested ecosystem participants of a newly established or updated mapping between a Server Code and an Internet domain name and publishes the association to Server Lookup Services.

LOOKUP is a protocol whereby an ATSC Receiver can submit a Server Code to a Server Lookup Service and receive a response containing the associated Server Name which has been most recently published by the Server Registrar.

QUERY is a protocol whereby an ATSC Receiver can submit a Server Code and Interval Code to a CSM Server and receive ATSC metadata (e.g. channel, timecode, interactive services triggers, etc.) associated with the specified interval of broadcast content.

ATSC Receivers may obtain broadcast content essence absent the full ATSC broadcast stream from an MVPD via a STB. The ATSC receiver may provide the content essence to the watermark client for detection of any embedded codes. The speed of watermark detection, as well as the precision of detection location within the content, can be improved based on the disclosed watermark detection techniques. As part of watermark client implementation in a given product, associations between Server Codes and Server Names can be stored in a cache (e.g., memory device), but it can also include the Internet address of a Server Lookup Service so that it may lookup newly registered or modified Server Names. The cache may be pre-populated at the time at ATSC Receiver manufacture to reduce traffic to Server Lookup Services.

When the watermark client detects a watermark payload embedded in the content that it receives, it checks to determine whether or not the detected Server Code is present in its cache. If it is, the watermark client queries the CSM Server whose Server Name is associated with the Server Code to obtain the metadata associated with the detected watermark payload. If the Server Code from the detected watermark is not present in its cache, or if the contacted server fails to respond as expected, the watermark client may look up the current Server Name associated with the Server Code from the Server Lookup Service, cache the result, and then initiate a query directed at the newly identified Server Name.

Watermark clients may be configured to initiate a query only for certain watermark detections; e.g. the first one after playback begins, the first one after a channel change, only those with the Trigger field set if a query has not been performed within the past, e.g., 30 seconds, etc. Timecode metadata provided to watermark clients by the CSM Server can be used in conjunction with data recovered from the watermark detection process to determine the original media timecode of the broadcast content with frame or millisecond accuracy. The disclosed watermark detection techniques can improve the speed of watermark recovery, which impacts both the time-to-first-detection and the time to first-change-in-trigger-status. Further, by more precisely identifying the detected watermark boundaries, synchronization between the broadcast time and media timecodes can be improved.

In ACR applications, it is also important to precisely identify the end of a watermark segment. Such identification can in turn allow modifications to, or stoppage of, associated content and metadata. One approach for detecting the end of a watermarked content segment is simply anticipate and detect an absence of a watermark at an expected moment or within a predefined time interval. However, this approach may not produce the desired reliability because watermarks (or portions thereof) may be missing due to unfavorable content properties, or due to content processing such as perceptual compression, which make those watermarks practically undetectable.

To further facilitate the understanding of the disclosed techniques, it is assumed that a watermark is formed as a string of digital symbols (which can be represented as a binary string). This string can carry a synchronization portion (or header), followed by main data-carrying portion (sometimes called a "payload"), and redundancy symbols added to effectuate error correction and/or error detection. As described earlier, the payload of the watermark can carry various information, including a Server Code, an Interval Code and a Trigger, as well as other information such as a content ID and a channel ID. One section of the watermark payload (e.g., the Interval Code, or another field) can be designated to carry a watermark counter that is incremented for each embedded watermark. In some implementations, such a counter may not necessarily be sequential but rather can change based on a predicable pattern from one watermark to the next. Once such a watermark is detected from a content segment, by knowing the length of the embedded watermarks (which is usually the case), the position of that content segment with respect to first embedded watermark (e.g., the start of the content) can be readily determined. Thus, the embedded counter value can operate as a timeline indicator of the content.

One way to improve reliability of marked content end detection is to use watermark prediction. A predicted watermark can be correlated with an extracted watermark and if the correlation is high, it can be concluded that the content includes the watermark. But if the correlation is low, it can be concluded that the watermark is not present. This way, without having an actual knowledge of the watermark payload that can be dynamically changing throughout the content, it can be determined whether or not a content is marked (i.e., includes a watermark) even if the watermark or watermarks that designate the end of a marked segment (or significant portions thereof) are missing.

Watermark prediction techniques of the present application generate a predicted watermark payload (or template) by taking into account possible changes that can occur in the watermark payload across a content, or within specific segments of the content. In one example, watermark prediction takes into account an expected change in the value of a watermark counter that constitutes part of the embedded watermarks. Some payload changes cannot be predicted with a desired certainty, such as changes in a trigger flag, which, as described earlier, can be part of a watermark payload in ACR applications. In those cases, predications for each possible payload variation can be produced and their respective correlations with the extracted watermarks can be tested for each of the prediction variations. It should be noted that under some circumstances, not all possible prediction variations need to be tested, such as when the testing of a particular predicted payload variation results in a high (e.g., exceeding a pre-determined threshold) correlation value. In such a case, the testing for the remaining predicted payload variations can be halted.

In some implementations, upon detection of the acceptable correlation value, the process may not halt. But rather the process can continue so that other correlation results are obtained and analyzed in order to select the best, or a more suitable, correlation result (e.g., the highest correlation result).

In some implementations, correlation between a predicted and an extracted watermark can be carried out by using a predicted watermark waveform. Such a waveform can, for example, be a watermark signal that would be detected if a particular bit pattern were embedded in the content. The digital samples of such a watermark waveform can then be correlated with an extracted watermark waveform samples, such as a waveform that is produced by actually attempting to extract the watermark from the host content. This approach may require a very precise timing of the embedded watermarks, as well as a significant processing power. In one embodiment, only the watermark bit pattern is predicted and correlated with the extracted bit pattern that is obtained by attempting to extract the watermark from the host content. As such, the predicted bit pattern becomes a template comprising a number of bits (or symbols), which is used for correlation with the extracted bit tor symbol) pattern. As part of the correlation process, the number of mismatches between the predicted and extracted bit patterns can be counted, and if the number of mismatches is below a desired error count threshold, a successful detection of the end watermark is signaled. The value of the threshold is a system design parameter. Such a threshold can, for example, be a predetermined value that is set based on an acceptable level of false positive detections, expected amounts and types of content distortions, and other factors.

When the watermark bit pattern is long, it is often advantageous to determine the correlation between the extracted bit patterns and the predicted bit patterns on strings that are shorter than the entire watermark string. This way, the end of a marked segment can be detected faster than when predication is applied to the entire watermark message.

Furthermore, prediction of a fragment of the watermark bit string can be used to confirm quickly that the extracted payload is not a false detection. It is well known that error correction codes sometimes cause a false detection of a watermark in even an unmarked content which lacks any watermarks, or can cause a mis-detection that identifies an incorrect watermark value from a marked content. Typically error correction algorithms provide information on how many errors are detected or corrected in the particular extraction event. If the number of corrected or detected errors is too high, then the false positive probability may be unacceptably high. In some embodiments that utilize error correction codes, if the number of corrected or detected errors is too high, declaration of a successful watermark extraction is postponed, by first confirming the correctness of the payload by predicting subsequent one or more bit string fragments, and verifying that the subsequent bit string fragment(s) can indeed be successfully extracted using the correlation techniques described earlier. Only if the subsequent bit string fragment is found with a sufficiently low mismatch count that is below a predetermined threshold, the detector can report the extracted payload. This way, the time to first watermark detection can be shorter compared to the scenario where correlation with the entire watermark string is carried out.

The predication techniques of the present application thus improve the detection of watermarks from a multimedia host content that can be applicable for many applications, including ACR systems. For example, after processing the host content to extract a candidate string of watermark bits that are embedded in a section of the host content, the extracted candidate watermark bits may fail to convey the presence of a particular watermark with a desired level of reliability. In such a case, at least one predicted string of watermark bits can be produced and the number of mismatches between the candidate string of watermark bits and at least one of the predicted string of watermark bits is determined Upon a determination that the number of mismatches is below a pre-determined value for at least one of the predicted string of watermark bits, an indication can be produced that the candidate string of watermark bits represents a reliably extracted watermark. The number of mismatches can be determined using a correlation function. In some example embodiments, at least one predicted string of watermark bits can produced based on a predetermined event that is expected to occur. Such a predetermined event can, for example, be a change in the value of a counter that is incorporated as part of the watermark payload, or a change in the string of bits that represent the watermark compared to one or more watermarks that are extracted from a different section of the host content.

In some embodiments, the predicted string of watermark bits can be produced based on a plurality of possible predicted bit strings. In such a case, the number of mismatches between each of the plurality possible predicted bit strings and the candidate string is determined. A successful detection is declared if one of the mismatch counts is below a predetermined value.

When the number of mismatches is not below a predetermined value, a partial string of predicted watermark bits that are expected to have been embedded in a subsequent section of the host content can be constructed, and a partial string of candidate watermark bits can be extracted from a subsequent section of the content. By comparing the candidate partial string and the extracted partial string, it can be determined whether the number of mismatches is below a second predetermined value, and if so, produce an indication that the candidate string of watermark bits represents a reliably extracted watermark.

In some implementations, an error detection/correction code can be used to produce an indication as to a number of detected errors and/or corrected errors in the extracted string of watermark bits that are recovered from the host content. The use of error counts produced by error correction/detection codes can be used to trigger a watermark predication operation to confirm that the detected watermark is indeed reliably detected.

The section of the marked host content that includes the detected watermark can represent an end section of the marked host content, such a last section of the host content that is marked with a particular type of watermark. The section of the marked host content that includes at least part of the watermark can include a featureless section of the marked content (e.g., a blank or mute section) that is produced, for example, when the content is paused, skipped or when the channel is changed (e.g., on a set top box).

Figure 3:
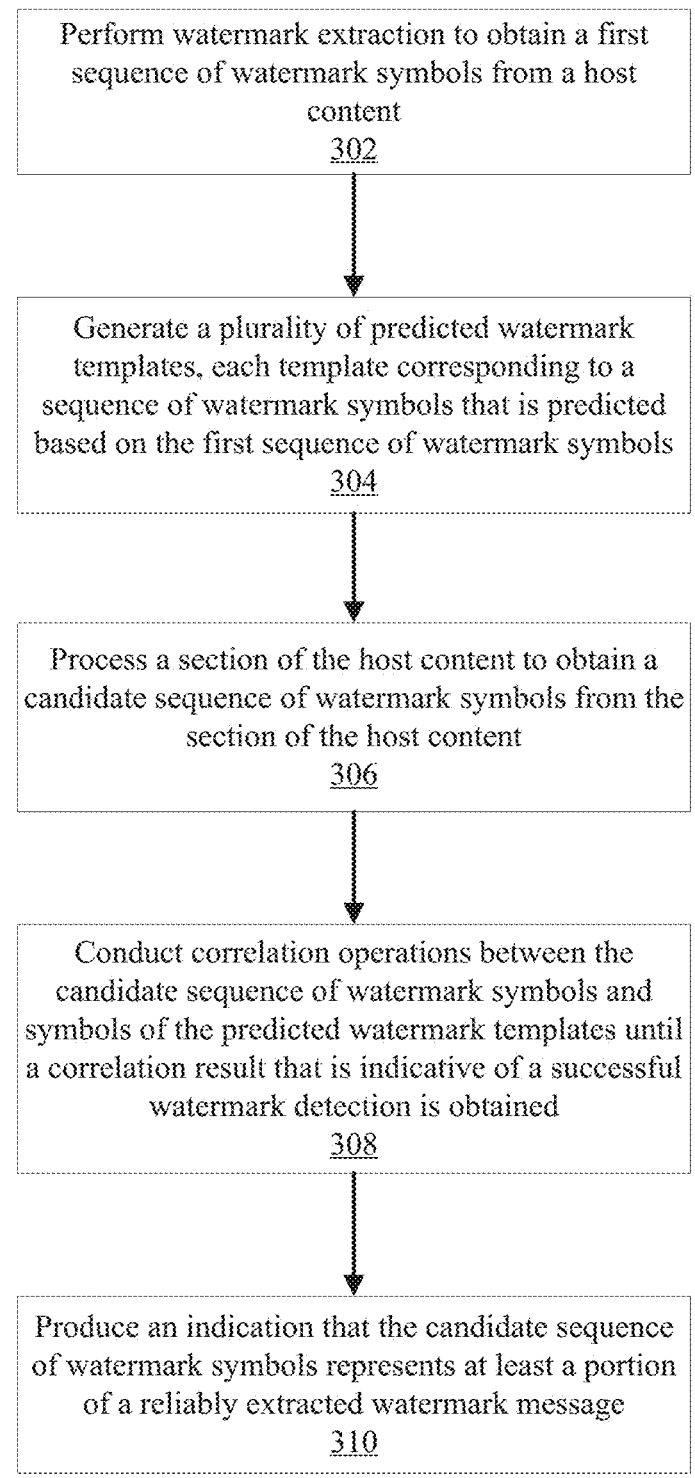
FIG. 3 illustrates a set of operations that can be carried out for detecting watermarks from a multimedia content in accordance with an exemplary embodiment.

FIG. 3 illustrates a set of operations for detecting watermarks that are embedded in a host content in accordance with an exemplary embodiment. At 302, watermark extraction operations are performed to obtain a first sequence of watermark symbols from the host content is obtained. At 304, a plurality of predicted watermark templates is generated. Each template corresponds to a sequence of watermark symbols that is predicted based on the first sequence of watermark symbols. At 306, a section of the host content is processed to obtain a candidate sequence of watermark symbols from the section of the host content. At 308, correlation operations between the candidate sequence of watermark symbols and symbols of the predicted watermark templates are conducted until a correlation result that is indicative of a successful watermark detection is obtained. At 310, an indication is produced that indicates the candidate sequence of watermark symbols represents at least a portion of a reliably extracted watermark message.

As noted earlier, the one or more of the plurality of the predicted watermark templates generated at 304 can be based on a predetermined change in the first sequence of watermark symbols. In one embodiment, the predetermined change is a change in a counter value that is incorporated as part of the first sequence of watermark symbols. In another embodiment, the predetermined change is a change in flag value that is incorporated as part of the first sequence of watermark symbols. In some embodiments, the first sequence of watermark symbols corresponds to a reliably extracted watermark message from another section of the host content. In some embodiments, the first sequence of watermark symbols corresponds to an extracted watermark message from the host content with an associated reliability that is below a predetermined level of reliability. In this scenario, the correlation result that is indicative of a successful watermark detection establishes that the first sequence of watermark symbols represents a reliably extracted watermark message. The first sequence of watermark symbols could have been produced using an error correction code or an error detection code that indicates the first sequence of watermark symbols is associated with a particular number of erroneous symbols that exceeds a specific threshold. Thus the first sequence of watermark symbols may not have been reported as being a reliably detected watermark prior to the confirmation obtained through correlation operations conducted using predicted watermark templates.

In one embodiment, the correlation operations include comparing the symbols of the candidate sequence of watermark symbols to the symbols of the predicted watermark template to produce an error count that represents a number of mismatched symbols for each predicted watermark template that is subject to the correlation operations. The correlation result that is indicative of a successful watermark detection can be obtained upon a determination that such an error count is below a particular threshold value. The particular threshold value can be determined based on one or more of the following: a level of acceptable false positive detections, an expected amount of distortion in the host content, or a expected type of distortion in the host content.

In another embodiment, at least one of the predicted watermark templates corresponds to only a fragment of a full watermark message. In one embodiment, conducting the correlation operations includes evaluating a plurality of correlation results to select which one of the plurality of correlation results is indicative of a successful watermark detection. In yet another embodiment, the section of the host content that is received and processed includes at least one partial watermark message. In this case, the indication that the candidate sequence of watermark symbols represents at least a portion of a reliably extracted watermark message confirms the presence of the partial watermark message in the section of the host content. Further, an indication can be produced to indicate that such a section of the host content represents an end section of a marked content.

In some embodiments, based on the predicated watermark template that produced the correlation result indicative of a successful watermark detection, a change in playback or presentation of another content or a service is triggered. In yet another embodiment, based on the particular predicated watermark template that produced the correlation result indicative of a successful watermark detection, a request for metadata associated with the host content is triggered. For example, a portion of the successfully detected watermark payload (e.g., the Server Code and Interval Code of the payload) can be used to obtain and/or present a different secondary content.

In one exemplary embodiment, the above noted method for detecting watermarks that are embedded in a host content further includes processing the section of the host content to obtain a second candidate sequence of watermark symbols from the section of the host content, and conducting correlation operations between the second candidate sequence of watermark symbols and symbols of the plurality of predicted watermark templates. In this embodiment, upon a determination that none of the plurality of predicted watermark templates produces a correlation value that corresponds to a successful watermark detection, producing an indication that the second candidate sequence of watermark symbols does not represent a reliably extracted watermark message or a portion thereof.

Figure 4:
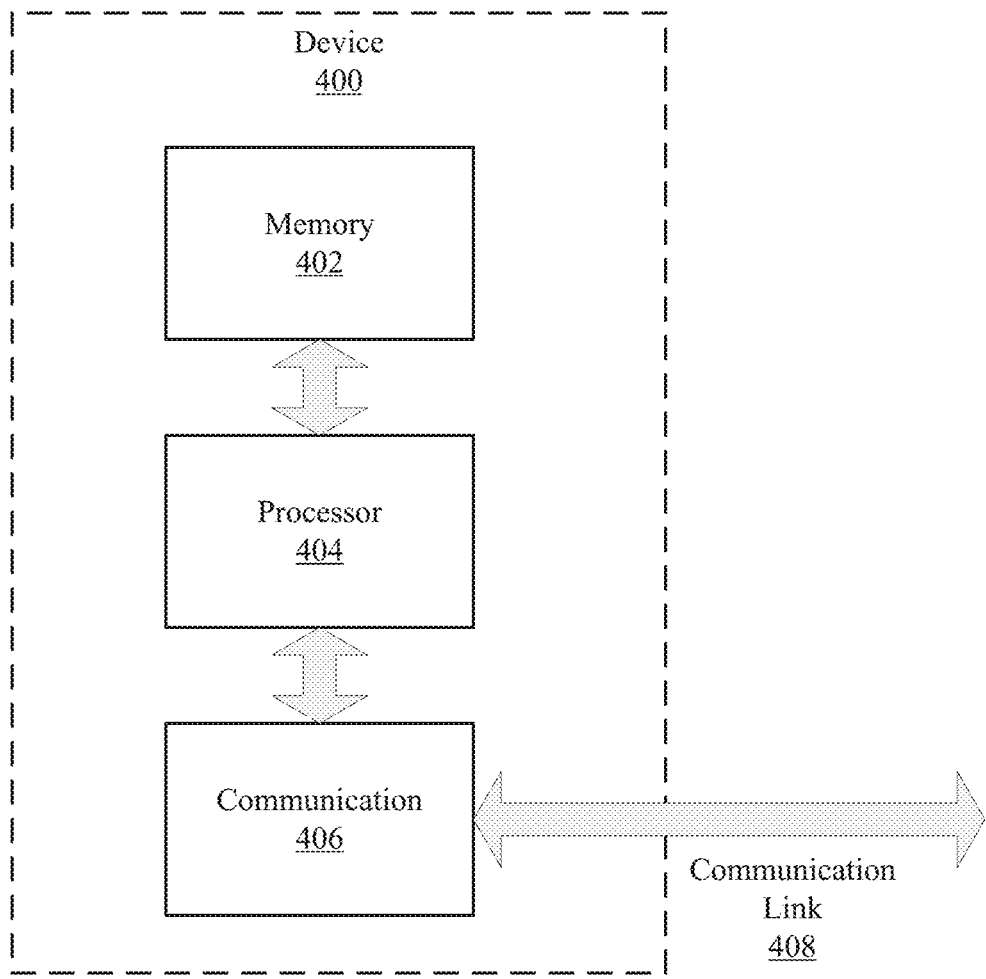
FIG. 4 illustrates a block diagram of a device for implementing various disclosed embodiments.

Certain aspects of the disclosed embodiments can be implemented as a device that includes a processor, and a memory comprising processor executable code. The processor executable code, when executed by the processor, configures the device to perform any one of and/or all operations that are described in the present application. FIG. 4 illustrates a block diagram of a device 400 within which various disclosed embodiments may be implemented. The device of FIG. 4 can be implemented as part of any one of: the Receiver device that is shown in FIG. 1 and includes a Watermark Detector, or as part of the Receiver, or the Watermark Client that are shown in FIG. 2. The device 400 comprises at least one processor 404 and/or controller, at least one memory 402 unit that is in communication with the processor 404, and at least one communication unit 406 that enables the exchange of data and information, directly or indirectly, through the communication link 408 with other entities, devices, databases and networks. The communication unit 406 may provide wired and/or wireless communication capabilities in accordance with one or more communication protocols, and therefore it may comprise the proper transmitter/receiver, antennas, circuitry and ports, as well as the encoding/decoding capabilities that may be necessary for proper transmission and/or reception of data and other information. The exemplary device 400 of FIG. 4 may be integrated as part of any devices or components shown in FIG. 1 or FIG, 2 to early out any of the disclosed methods.

The components or modules that are described in connection with the disclosed embodiments can be implemented as hardware, software, or combinations thereof. For example, a hardware implementation can include discrete analog and/or digital components that are, for example, integrated as part of a printed circuit board. Alternatively, or additionally, the disclosed components or modules can be implemented as an Application Specific Integrated Circuit (ASIC and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

For example, one aspect of the disclosed embodiments relates to a computer program product that is embodied on a non-transitory computer readable medium. The computer program product includes program code for carrying out any one or and/or all of the operations of the disclosed embodiments.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein my be combined in all possible combinations of methods, apparatus, modules, systems, and computer program products, as well as in different sequential orders. Any embodiment may further be combined with any other embodiment.

What is claimed is:

1. A method for detecting watermarks from a host content, comprising:
   performing watermark extraction to obtain a first sequence of watermark symbols from the host content;
   generating a plurality of predicted watermark templates, each template corresponding to a sequence of watermark symbols that is predicted based on the first sequence of watermark symbols;
   processing a section of the host content to obtain a candidate sequence of watermark symbols from the section of the host content;
   conducting correlation operations between the candidate sequence of watermark symbols and symbols of the predicted watermark templates until a correlation result that is indicative of a successful watermark detection is obtained; and
   producing an indication that the candidate sequence of watermark symbol represents at least a portion of a reliably extracted watermark message.

2. The method of claim 1, wherein one or more of the plurality of the predicted watermark templates is generated based on a predetermined change in the first sequence of watermark symbols.

3. The method of claim 2, wherein the predetermined change is a change in a counter value that is incorporated as part of the first sequence of watermark symbols.

4. The method of claim 2, wherein the predetermined change is a change in flag value that s incorporated as part of the first sequence of watermark symbols.

5. The method of claim 1, wherein the first sequence of watermark symbols corresponds to a reliably extracted watermark message from another section of the host content.

6. The method of claim 1, wherein:
   the first sequence of watermark symbols corresponds to an extracted watermark message from the host content with an associated reliability that is below a predetermined level of reliability, and
   the correlation result that is indicative of a successful watermark detection establishes that the first sequence of watermark symbols represents a reliably extracted watermark message.

7. The method of claim 6, wherein the first sequence of watermark symbols is produced using an error correction code or an error detection code that indicates the first sequence of watermark symbols is associated with a particular number of erroneous symbols that exceeds a specific threshold.

8. The method of claim 1, wherein the correlation operations include comparing the symbols of the candidate sequence of watermark symbols to the symbols of the predicted watermark template to produce an error count that represents a number of mismatched symbols for each predicted watermark template that is subject to the correlation operations.

9. The method of claim 8, wherein the correlation result that is indicative of a successful watermark detection is obtained upon a determination that the error count is below a particular threshold value.

10. The method of claim 9, wherein the particular threshold value is determined based on a level of acceptable false positive detections, an expected amount of distortion in the host content, or an expected type of distortion in the host content.

11. The method of claim 1, wherein at least one of the predicted watermark templates corresponds to only a fragment of a full watermark message.

12. The method of claim 1, wherein conducing correlation operations includes evaluating a plurality of correlation results to select which one of the plurality of correlation results is indicative of a successful watermark detection.

13. The method of claim 1, wherein
   the section of the host content includes at least one partial watermark message, and
   the indication that the candidate sequence of watermark symbols represents at least a portion of a reliably extracted watermark message confirms the presence of the partial watermark message in the section of the host content.

14. The method of claim 13, further comprising: producing an indication that the section of the host content represents an end section of a marked content.

15. The method of claim 1, further comprising, based on the predicated watermark template that produced the correlation result indicative of a successful watermark detection, triggering a change in playback or presentation of another content or a service that is associated with the host content.

16. The method of claim 1, further comprising, based on the predicated watermark template that produced the correlation result indicative of a successful watermark detection, triggering a request for metadata associated with the host content.

17. The method of claim 1, further comprising:
   processing the section of the host content to obtain a second candidate sequence of watermark symbols from the section of the host content;

conducting correlation operations between the second candidate sequence of watermark symbols and symbols of the plurality of predicted watermark templates; and upon a determination that none of the plurality of predicted watermark templates produces a correlation value that corresponds to a successful watermark detection, producing an indication that the second candidate sequence of watermark symbols does not represent a reliably extracted watermark message or a portion thereof.

18. A device, comprising:

a processor, and a memory including processor executable code, the processor executable code, when executed by the processor configures the device to:

conduct watermark extraction operations to obtain a first sequence of watermark symbols from a host content;

generate a plurality of predicted watermark templates, each template corresponding to a sequence of watermark symbols that is predicted based on the first sequence of watermark symbols;

process a section of the host content to obtain a candidate sequence of watermark symbols from the section of the host content;

conduct correlation operations between the candidate sequence of watermark symbols and each of the predicted watermark templates until a correlation result that is indicative of a successful watermark detection is obtained; and produce an indication that the candidate sequence of watermark symbols represents at least a portion of a reliably extracted watermark message.

19. The device of claim 18, wherein the processor executable code, when executed by the processor configures the device to generate one or more of the plurality of the predicted watermark templates based on a predetermined change in the first sequence of watermark symbols.

20. The device of claim 19, wherein the predetermined change is a change in a counter value that is incorporated as part of the first sequence of watermark symbols.

21. The device of claim 19, wherein the predetermined change is a change in flag value that is incorporated as part of the first sequence of watermark symbols.

22. The device of claim 18, wherein the first sequence of watermark symbols corresponds to a reliably extracted watermark message from another section of the host content.

23. The device of claim 18, wherein:

the first sequence of watermark symbols corresponds to an extracted watermark message from the host content with an associated reliability that is below a predetermined level of reliability, and the correlation result that is indicative of a successful watermark detection establishes that the first sequence of watermark symbols represents a reliably extracted watermark message.

24. The device of claim 23, wherein the first sequence of watermark symbols is produced using an error correction code or an error detection code that indicates the first sequence of watermark symbols is associated with a particular number of erroneous symbols that exceeds a specific threshold.

25. The device of claim 18, wherein the correlation operations include comparing the symbols of the candidate sequence of watermark symbols to the symbols of the predicted watermark template to produce an error count that represents a number of mismatched symbols for each predicted watermark template that is subject to the correlation operations.

26. The device of claim 25, wherein the correlation result hat is indicative of a successful watermark detection is obtained upon a determination that the error count is below a particular threshold value.

27. The device of claim 26, wherein the particular threshold value is determined based on a level of acceptable false positive detections, an expected amount of distortion in the host content, or an expected type of distortion in the host content.

28. The device of claim 18, wherein at least one of the predicted watermark templates corresponds to only a fragment of a full watermark message.

29. The device of claim 18, wherein correlation operations include evaluation of a plurality of correlation results to select which one of the plurality of correlation results is indicative of a successful watermark detection.

30. The device of claim 18, wherein the section of the host content includes at least one partial watermark message, and the indication that the candidate sequence of watermark symbols represents at least a portion of a reliably extracted watermark message confirms the presence of the partial watermark message in the section of the host content.

31. The device of claim 30, wherein the processor executable code, when executed by the processor further configures the device to produce an indication that the section of the host content represents an end section of a marked content.

32. The device of claim 18, wherein the processor executable code, when executed by the processor further configures the device to, based on the predicated watermark template that produced the correlation result indicative of a successful watermark detection, trigger a change in playback or presentation of another content or a service that is associated with the host content.

33. The device of claim 18, wherein the processor executable code, when executed by the processor further configures the device to, based on the predicated watermark template that produced the correlation result indicative of a successful watermark detection, trigger a request for metadata associated with the host content.

34. The device of claim 18, the processor executable code, when executed by the processor further configures the device to:

process the section of the host content to obtain a second candidate sequence of watermark symbols from the section of the host content;

conduct correlation operations between the second candidate sequence of watermark symbols and symbols of the plurality of predicted watermark templates; and upon a determination that none of the plurality of predicted watermark templates produces a correlation value that corresponds to a successful watermark detection, produce an indication that the second candidate sequence of watermark symbols does not represent a reliably extracted watermark message or a portion thereof.

35. A computer program product, embodied on one or more non-transitory computer readable medium, comprising:

program code for conducting watermark extraction operations to obtain a first sequence of watermark symbols that is expected to be present in the host content;

program code for generating a plurality of predicted watermark templates, each template corresponding to a sequence of watermark symbols that is predicted based on the first sequence of watermark symbols;

program code for processing a section of the host content to obtain a candidate sequence of watermark symbols from the section of the host content;

program code for conducting correlation operations between the candidate sequence of watermark symbols and symbols of the predicted watermark templates until a correlation result that is indicative of a successful watermark detection is obtained; and program code for producing an indication that the candidate sequence of watermark symbols represents at least a portion of a reliably extracted watermark message.

* * * * *

UNITED STATES PATENT AND TRADEMARK OFFICE
CERTIFICATE OF CORRECTION

PATENT NO. : 9,639,911 B2
APPLICATION NO. : 14/830641
DATED : May 2, 2017
INVENTOR(S) : Rade Petrovic, Jian Zhao and Joseph Winograd It is certified that error appears in the above-identified patent and that said Letters Patent is hereby corrected as shown below:

In the Specification

Column 3, Line 41, delete "predicated" and insert -- predicted --, therefor.

Column 3, Line 47, delete "predicated" and insert -- predicted --, therefor.

Column 13, Line 59, delete "predicated" and insert -- predicted --, therefor.

Column 13, Line 63, delete "predicated" and insert -- predicted --, therefor.

In the Claims

Column 16, Line 55, Claim 15, delete "predicated" and insert -- predicted --, therefor.

Column 16, Line 60, Claim 16, delete "predicated" and insert -- predicted --, therefor.

Column 18, Line 35, Claim 32, delete "predicated" and insert -- predicted --, therefor.

Column 18, Line 42, Claim 33, delete "predicated" and insert -- predicted --, therefor.

Signed and Sealed this
Seventh Day of April, 2020

Andrei Iancu
*Director of the United States Patent and Trademark Office*